Patented Oct. 3, 1950

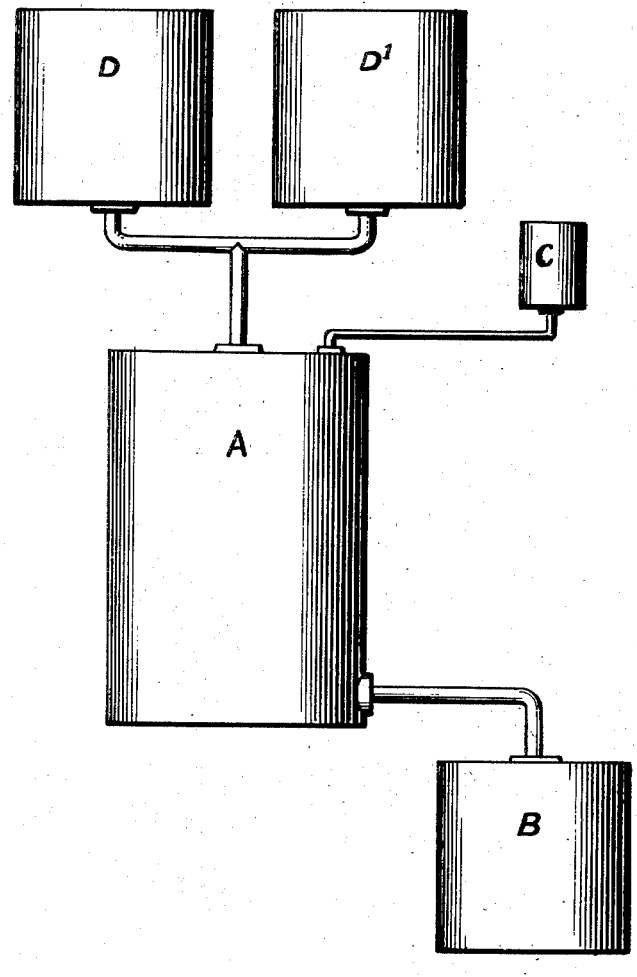

2,524,200

UNITED STATES PATENT OFFICE 2,524,200

CONTINUOUS METHOD OF CONDUCTING MICROBIOLOGICAL PROCESSES

Alfred J. Liebmann and George T. de Becze, Cincinnati, Ohio, assignors to Schenley Industries, Inc., a corporation of Delaware Application October 10, 1945, Serial No. 621,406

3 Claims. (Cl. 195—36)

This invention relates to a continuous method of conducting micro-biological processes.

It applies to the production of antibiotics by such micro-biological processes.

It applies particularly to the production of penicillin by penicillin-producing molds.

We prefer to use a liquid nutrient for the propagation of *Penicillium notatum*, and to produce the penicillin in such liquid nutrient. We also prefer to use the submerged-culture technique.

It is well-known to propagate *Penicillium notatum* and to produce penicillin in liquid nutrient media, by the submerged-culture technique. In such technique, the mold is submerged in the liquid nutrient, which is subjected to agitation and aeration.

Such micro-biological processes have heretofore been conducted by the batch method, whereby a batch of the nutrient was inoculated with the respective mold or other micro-organism, and the fermentation was completed in said batch while the batch was agitated and aerated, until the maximum production of penicillin, for example, was completed in said batch.

Such batch method is slow and expensive, and it has many other disadvantages, especially as applied to the production of antibiotics, and more particularly, to the production of penicillin by the action of *Penicillium notatum*.

In the batch method, the sterile nutrient liquid is exposed to infection with every inoculum, originating from said inoculum, or from the outside atmosphere, due to technical mistakes during the step of inoculation.

The mold in every inoculum, which must be prepared separately for every batch, is subject to undesired mutation, which lowers its ability to produce penicillin. Hence the yield is subject to undesirable change with every new batch.

In producing penicillin in a batch of such medium, the rate of propagation of the mold increases to a maximum after a certain period, which depends upon propagating conditions. The rate of propagation then diminishes from said maximum rate. When such rate of propagation is at its maximum, the continued fermentation produces substances which tend to destroy the penicillin in the liquid batch. Such objectionable substances include an excess of certain organic acids, or ammonia which is produced by the deamination of amino-acids.

When inoculum is added to a fresh batch of nutrient, there is a long starting period of incubation, which increases the time and expense of production. When the fermentation of the batch has been completed, it is necessary to empty and clean the fermenter or tank, then to sterilize the empty fermenter or tank, then to re-fill it with a new batch of nutrient, and then to sterilize the new batch of nutrient in the tank. This lengthy procedure increases the time and expense of production.

According to our method, we secure continuous production, and we eliminate the above-mentioned disadvantages. We use a plurality of fermentation tanks, two or more, which are used in series.

We propagate the mold or other microorganism in the nutrient medium of the first fermenter, and we maintain fermentation in the first fermenter, below the stage which would produce objectionable material, or an excess of materials which are harmful at high concentration. We transfer part of the partially fermented nutrient and mold or other micro-organism from said first fermenter to the next succeeding fermenter. We use other precautions and steps which are later explained herein.

Numerous additional features and advantages of our invention are stated in the annexed description and diagrammatic drawing.

The invention is explained by an illustrative example, for the production of penicillin by *Penicillium notatum*.

EXAMPLE

Step No. 1

The first fermenter or tank A is closed, save for sterilized inlets whereby it is connected to an inoculum tank C, which contains the inoculum, and to two storage tanks D and D', which contain the sterilized nutrient. The capacity of the first fermenter A is 6000 gallons. This tank A, which constitutes a first fermentation zone, is partially filled with a first pool 4000 gallons of liquid nutrient. Said 4000 gallons of liquid nutrient consist of 3800 gallons of water, 1300 pounds of standard corn steep liquor, and 650 pounds of milk sugar. We can use any suitable nutrient.

The nutrient is sterilized by heating it in the closed tanks A and D and D' under a pressure of 15 pounds per square inch, corresponding to a temperature of about 121° C., during a period of 45 minutes.

The pipe connections between tank A, and the tanks B, C, D and D' are closed during said heating period. This heating also sterilizes the interior of tank A. The closed tank A and its contents are then cooled to 24° C., while said pipe connections are closed. Since the drawing is wholly diagrammatic, it does not show the necessary valves in the connections. The feed between the respective tanks may be a gravity feed, or pumps may be used, provided that all parts are kept absolutely sterile and protected against contamination by stray micro-organisms.

Step No. 2

After the sterilized nutrient in tank A has been cooled to 24° C., the batch of 4000 gallons is inoculated with 100 gallons of standard inoculum from tank C. The mold is propagated in the nutrient in tank A during a period of 48 hours, said temperature being maintained at 24° C. during this propagation period. The 100 gallons of inoculum are immediately uniformly intermixed with the 4000 gallons of nutrient. In this example, we use the submerged culture technique in propagating the mold. The batch in tank A is vigorously stirred, and the growth of the mold is promoted by passing 250 cubic feet of sterile air per minute through the batch in tank A by means of the usual stirring and distributing apparatus, said air being bubbled upwardly through the first pool in the usual manner, to secure continuous and uniform aeration of the batch. This is at the rate of about 0.06 cubic foot of air per minute, per gallon of nutrient in the first pool.

As previously stated, the period of propagation in tank A is 48 hours. At the end of said period, the pH of the batch in tank A is 7.0 to 7.2, depending on the mold strain.

At the end of this period of 48 hours, the mold content is 0.5 gram to 0.6 gram (dry basis) per 100 cubic centimeters of the nutrient.

If the nutrient were fermented in tank A to its maximum extent by *Penicillium notatum*, the production of the mold would be about 0.7 gram to 0.8 gram (dry basis) per 100 cubic centimeters of nutrient, and the pH would be about 7.3.

At the end of this propagation period of 48 hours in tank A, the rate of propagation is a maximum, but the fermentation has not yet produced injurious substances, or an excess of substances which are non-injurious in low concentration. This objectionable stage of the fermentation, which would produce ammonia or an excess of organic acids, succeeds the stage of maximum rate of propagation, after a short period.

Step No. 3

The fermented liquid in tank A, immediately at the end of said period of 48 hours, is fed continuously into the second fermenter or tank B, at the rate of 82.5 gallons per hour. Said tank B is sterile and it constitutes a second fermentation zone. The liquid which is fed into tank B contains unconsumed nutrient, mold pellets, and penicillin. The pool in tank A is maintained at a constant volume of 4000 gallons, by feeding fresh sterilized nutrient from storage tank D or D' into tank A, at the same rate of 82.5 gallons per hour. The fresh nutrient liquid has the composition of the starting liquid in tank A. Such fresh sterilized nutrient is supplied to tank A, at a temperature of 24° C., which is maintained in tank A.

The replenishing of the pool in tank A, by fresh and wholly unfermented nutrient, has the effect of preventing the fermentation in tank A from reaching the objectionable point or stage at which undesirable materials, or excessive concentrations of materials which are harmless at low concentrations, is reached. At the same time, the rate of propagation of the mold in tank A is maintained in its most violent and active stage.

The tank B has a capacity of 2000 gallons. The material from tank A is fed into tank B during a filling period of 12 hours to 16 hours, so that the volume of the pool in tank B is maintained below about 1500 gallons. The material which is fed into tank B from tank A, has at least 150-250 units activity per cubic centimeter, depending on the particular strain of penicillin-producing mold.

During the filling period, the mixed nutrient and mold and penicillin which are supplied from tank A to tank B, are kept at a temperature of 24° C., in tank B. This temperature of 24° C. is maintained at all times in tank B.

The rate of propagation of the mold in tank B is reduced below the rate of propagation in tank A, thus preventing the formation of ammonia, excess organic acids, etc.

Step No. 4

After the pool in tank B has reached the required volume of about 1500 gallons, the volume of said pool is kept constant, by withdrawing the material therefrom at the rate of feed thereto, namely, about 82.5 gallons per hour. The process is therefore continuous, after said initial filling period of 12 hours to 16 hours. The material which is thus continuously withdrawn from tank B is the final broth or end-product. It has a penicillin content of at least 250-350 units per cubic centimeter. Its pH is about 7.3. While the continuous process is operated, the rate of propagation of the mold in tank B, is kept sufficiently below the rate in tank A, to prevent the formation of ammonia, excess organic acids, etc.

By continuing the fermentation in tank B, without aeration, the rate of growth of the mold in tank B can be kept below the rate at which the objectionable materials will be produced. The mixture in tank B may optionally be mechanically agitated, without aeration, during the filling period and while the continuous process is in operation.

There may be some aeration of the material in tank B. Thus, if the second pool therein is maintained at a volume of 1500 gallons, sterile air may be used for aerating said pool by means of the usual stirring and distributing apparatus, at the rate of 20 cubic feet per minute. This is at the rate of about 0.013 cubic foot of air per minute, per gallon of nutrient in the second pool. The air is bubbled upwardly through the second pool, in the usual manner, using the usual stirrer.

Some of the importnat advantages of our invention are as follows:

We withdraw the material from tank A, when the mold is in its most violent and active stage, and before the excess organic acids, or ammonia, are produced in the nutrient.

By removing liquid from tank A, and replenishing the pool in tank A with fresh nutrient, we dilute the fermentation products in the pool in tank A. This is desirable, because an excess concentration of such fermentation products prevents the mold from remaining in young, strong, and healthy condition, with the desired enzyme activity.

The danger of infection is minimized or prevented.

The quantity of inoculum is greatly reduced, compared to the batch system. When inoculum is placed into a feeding tank, such inoculum cannot be resterilized, and it must be used immediately, when it is ripe for use. In contrast, the sterile nutrient medium in tanks D and D' can be resterilized whenever desired, and it can be stored for days or weeks before it is used, after it has been sterilized.

The danger of undesired mutation of the strain is greatly reduced, if not eliminated, because the same mold is used continuously, by propagating it uninterruptedly under identical conditions.

The over-ageing of the mold, which is characteristic of batch production, is eliminated. Such overageing endangers the previously produced penicillin. The stability of the penicillin in the final broth which is withdrawn from tank B, is greatly increased.

The continuous process is cheaper and gives much higher production than the batch process.

Numerous changes and additions and omissions can be made in and to the preferred disclosure, without departing from the scope of the invention. We can use more than two fermenters. The flow of material into or through the system need not be continuous. The volumes in the respective tanks need not be kept constant. The invention covers the respective steps and sub-combinations of the complete process.

In general, we only partially ferment the nutrient by means of a penicillin-producing mold in tank A, which defines a first fermentation zone. We withdraw a part of said partially fermented liquid nutrient and mold, from said first fermentation zone. We replenish said liquid with sterile nutrient. We continue the fermentation of the withdrawn and partially fermented nutrient, at a slower rate than the rate of fermentation in the first fermentation zone which is defined by fermenter A. We prefer to maintain respective liquid pools of respective constant volumes, in the first fermentation zone of tank or fermenter A, and in each succeeding fermentation zone or zones.

We prefer to maintain the batch of nutrient and mold in tank A at a pH of 7.0–7.2, and to continue the partially completed fermentation external to tank A, at a slower rate of fermentation than in cell A, until the final pH of the end-product is 7.2–7.4.

By replenishing the first pool with fresh nutrient at the rate above mentioned, we maintain the propagation in the first pool at its maximum rate, and we prevent the nutrient of the first pool from being completely fermented.

We claim:

1. A method of producing penicillin by fermenting a pool of liquid nutrient medium with penicillin-producing mold which consists in aerating said medium in said pool while propagating the mold therein by submerged culture, maintaining the propagation of said mold in said pool at substantially its maximum rate by only partially fermenting said medium in said pool and by withdrawing partially fermented medium from said pool and replenishing said pool with fresh nutrient, and completing the fermentation of said partially fermented and withdrawn medium externally of said pool, at lower aeration and slower fermentation than in said pool, the level of the penicillin in said pool being maintained at at least 150–250 units of penicillin per cubic centimeter.

2. A method of producing penicillin by fermenting a pool of liquid nutrient medium with penicillin-producing mold which consists in aerating said medium in said pool while propagating the mold therein by submerged culture, maintaining the propagation of said mold in said pool at substantially its maximum rate by only partially fermenting said medium in said pool and by withdrawing partially fermented medium from said pool and replenishing said pool with fresh nutrient, and completing the fermentation of said partially fermented and withdrawn medium externally of said pool, at lower aeration and slower fermentation than in said pool, the level of the penicillin in said pool being maintained at at least 150–250 units of penicillin per cubic centimeter, said partially fermented and withdrawn nutrient being additionally fermented externally of said pool to at least 350 units of penicillin per cubic centimeter.

3. A method of producing penicillin by fermenting a pool of liquid nutrient medium with penicillin-producing mold which consists in aerating said medium in said pool while propagating the mold therein by submerged culture, maintaining the propagation of said mold in said pool at substantially its maximum rate by only partially fermenting said medium in said pool and by withdrawing partially fermented medium from said pool and replenishing said pool with fresh nutrient, and completing the fermentation of said partially fermented and withdrawn medium externally of said pool, at lower aeration and slower fermentation than in said pool, the level of the penicillin in said pool being maintained at at least 150–250 units of penicillin per cubic centimeter, said partially fermented and withdrawn nutrient being additionally fermented externally of said pool to at least 350 units of penicillin per cubic centimeter, said additional fermentation being carried out in the absence of substantial aeration.

ALFRED J. LIEBMANN.
GEORGE T. DE BECZE.

REFERENCES CITED

The following references are of record in the file of this patent:

UNITED STATES PATENTS

| Number | Name | Date |
| --- | --- | --- |
| 1,875,536 | Wheeler et al. | Sept. 6, 1932 |
| 2,422,777 | Eisenberg et al. | June 24, 1947 |
| 2,424,832 | Koerber | July 29, 1947 |
| 2,442,141 | Moyer | May 25, 1948 |
| 2,443,989 | Moyer | June 22, 1948 |

OTHER REFERENCES

Clifton: Science, July 16, 1943, pages 69–70.
De Becze et al.: "Continuous Fermentation." American Brewer, February 1943, pages 11 to 16, 30, 32 and 34.